United States Patent [19]

Krebs

[11] Patent Number: 5,640,368
[45] Date of Patent: Jun. 17, 1997

[54] MIGRATION VELOCITY ANALYSIS USING LIMITED-APERTURE AND MONTE CARLO MIGRATION

[75] Inventor: Jerome R. Krebs, Houston, Tex.

[73] Assignee: Exxon Production Research Company, Houston, Tex.

[21] Appl. No.: 97,817

[22] Filed: Jul. 26, 1993

[51] Int. Cl.$^6$ .................................................. G01V 1/36
[52] U.S. Cl. ............................ 367/53; 367/51; 367/61; 364/421
[58] Field of Search ............................ 367/50–53, 61; 364/421

[56] References Cited

FOREIGN PATENT DOCUMENTS 9402667  1/1995  Norway.

OTHER PUBLICATIONS

Honjas, W.; Master's Thesis, University of Reno, Nevada, 1993, pp. 1–109; abst. only herewith.

Wang, D.; PHD Thesis, Sep. 1991, Wyoming University, pp. 1–112; abst,. only herewith.

Qin et al, 55th EAEG Mtg, Norway, Jun. 7, 1993, abst. only herewith.

Sun et al, 56th EAEG Mtg, Austria, Jun. 6, 1994, 2 pp, abst. only herewith.

"Velocity analysis by iterative profile migration."; Al-Yahya, K.; Geophysics, vol. 54, No. 6, pp. 718–729; (Jun. 1989).

"Wave equation datuming before stack"; Berryhill, J. R., Ed.; 54th Annual Intrnational Mtg., Society of Exploration Geophysicists (SEG), Expanded Abstracts; Tulsa, OK, SEG, Session:S2.6.

"A Directed–Aperature Kirchhoff Migration"; Carroll, R. J., et al.; Geophysical imaging, symposium of Geophysical Society of Tulsa; Tulsa SEG, pp. 151–165; (1987).

"Common–offet migrations and velocity analysis"; Deregowski, S. M.; First Break, vol. 8, No. 6, pp. 224–234; (Jun. 1990).

"Migration velocity analysis with the Kirchhoff integral."; Kim, Y. C. and Gonzalez; Geophysics, vol. 56, No. 3, pp. 366–370; (Mar. 1991).

"Three–dimensional migration of swath surveys"; Krebs, J. R.; Geophysics, vol. 55, no. 9, pp. 1251–1259; (Sep. 1990).

"Depth–Focusing Analysis Using a Wavefront–Curvature Criterion"; MacKay, S and Abma, R.; 62nd Annual International Mtg., Society of Exploration Geophysicists (SEG), Expanded Abstracts, Tulsa SEG, 927.

"Imaging and velocity estimation with depth–focusing analysis"; MacKay, S and Abma, R; Geophysics, vol. 57, No. 12, pp. 1608–1622; (Dec. 1992).

"Development of an Accurate, Stable, and Interactive Map Migration Algorithm"; Maher, S. M. and Hadley, D. M.; 55th Annual International Mtg., Society of Exploration Geophysicists (SEG), Expanded Abstracts, Tulsa, SEG, Session:S15.8.

Numerical Receipes: The Art of Scientific Computing; Press, W. J., Flannery, B. P., et al.; pp. 221–225; Cambridge University Press, Cambridge.

"Migration Velocity Analysis: A Comparison of Two Approaches"; Schleicher, K. L. Grygier, D. J., et al.; 61st Annual International Mtg., Society of Exploration Geophysicists (SEG), Expanded Abstracts, Tulsa SEG, pp. 1237–1238.

"Integral Formulation for Migration in Two and Three Dimensions"; Schneider, W. A.; Geophysics, vol. 43, No. 1, pp. 49–76.

"Migration velocity analysis by wave–field extrapolation"; Yilmaz, O and Chambers, R. E.; Geophysics, vol. 49, No. 10, pp. 1664–1674 (Oct. 1984).

Primary Examiner—Nelson Moskowitz
Attorney, Agent, or Firm—S. A. McLean; Stephen P. Koch

[57] ABSTRACT

Disclosed is a method for efficiently and accurately determining subsurface velocities for use in migration of seismic data. The method calls for restricting the number of traces considered to those lying upon that portion of the Kirchhoff summation curve wherein the integrand for Kirchhoff migration is smooth. In the preferred embodiment, only a random sample of traces within this aperture are used in the calculations. Improvements in efficiency on the order of a factor of 1000 can be realized with the preferred embodiment.

16 Claims, 8 Drawing Sheets

VELOCITY $V_1$                    VELOCITY $V_2$

MIGRATION VELOCITY ANALYSIS USING LIMITED-APERTURE AND MONTE CARLO MIGRATION

BACKGROUND OF THE INVENTION

1. Field of the Invention

This invention relates to the field of seismic imaging, particularly to two-dimensional and three-dimensional migration of surface seismic data. It consists of a method for efficiently obtaining an accurate velocity model, which model can be used in migration of seismic data.

2. Related Art

In seismic exploration of the earth, seismic energy is imparted to the earth. This energy travels into the earth and is reflected by the interfaces (reflectors; as used herein, "reflector" means the actual subsurface location of an interface and "reflection" means its apparent location by reference to unmigrated seismic data) between various subsurface formations. In typical seismic exploration, energy is imparted to the earth at a shot point location, and recorded at a number of geophone locations spaced at various distances away from the shot point. These various distances are termed "offsets." The offsets range typically on the order of 50 to 20,000 feet away from the shot point. The shot point is relocated, or a plurality of shot points are used, so as to obtain a plurality of traces at each geophone.

The output signal from each of the geophones is recorded as a function of time. It is desirable to convert this information so that the picture generated by displaying the traces actually corresponds to the depth of the various reflectors within the earth. In order to be able to translate this data into amplitude versus depth, rather than amplitude versus time, information, the velocities of the various subsurface formations must be determined. Accordingly, in order to provide accurate pictures of the subterranean structure of the earth, improved methods of determining the correct velocity of the seismic energy in the subterranean formations are required. These methods generally are performed on computers, particularly supercomputers able to manipulate large amounts of data efficiently.

The term "migration" refers to correction of data which were recorded as a function of time for the velocity of the wave in the subterranean structure. In this process, one can convert a number of offset versus time records, which records can then be displayed to yield a realistic picture of the structure.

Seismic migration requires an accurate model of the subsurface velocity. There are many existing methods for performing migration velocity analysis. Three are of particular significance: iterative prestack migration, prestack migration velocity sweeps and depth focusing analysis. The methods discussed herein all involve iterative prestack migration of the data with different velocities, to obtain an approximation of the velocity by trial and error.

Figure 1:
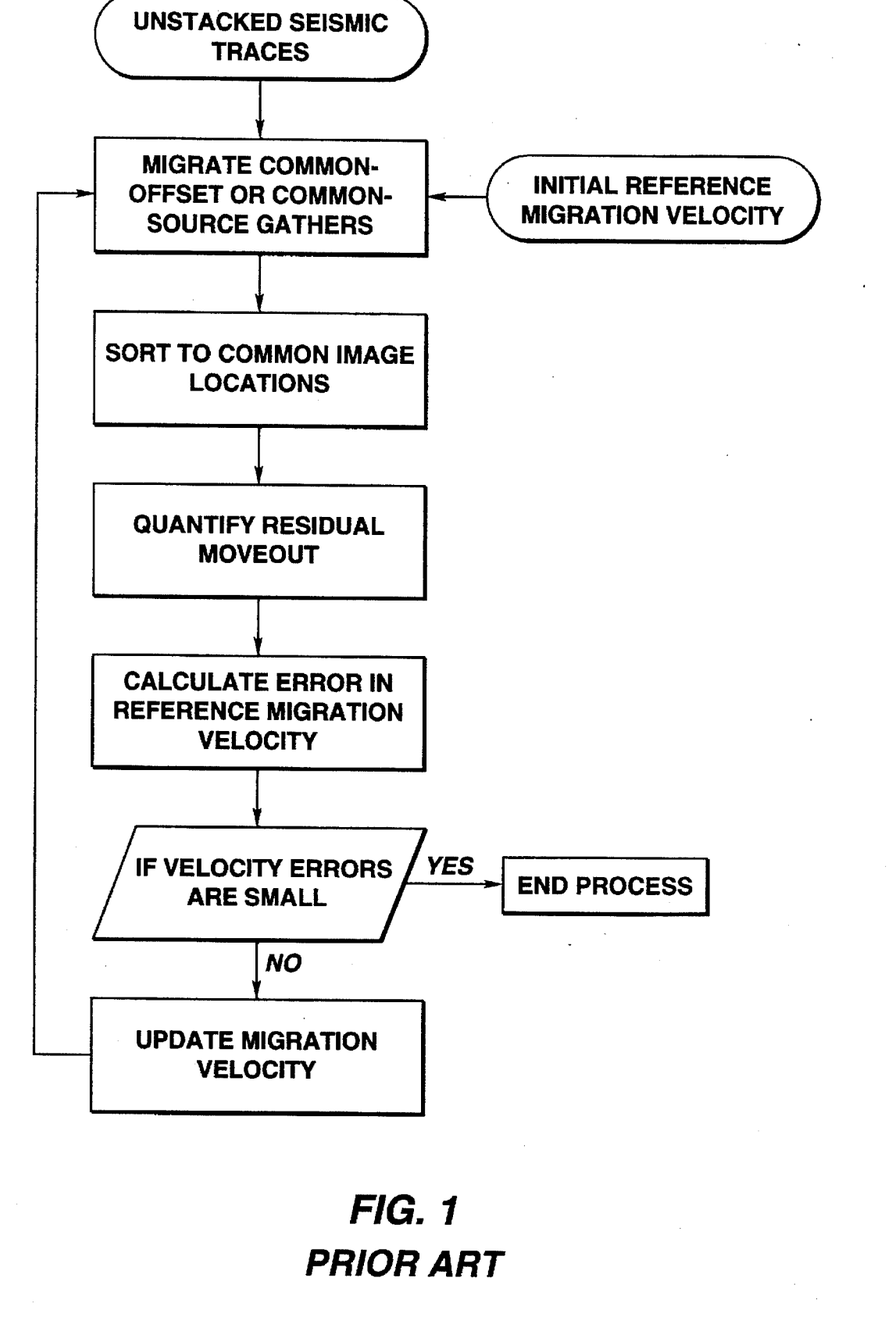
FIG. 1 depicts a flow chart for a typical iterative profile migration velocity analysis.

One method for obtaining migration velocities is to prestack migrate subsets (usually common-shot gathers or common offset gathers) of the seismic data with an initial reference migration velocity (Al-Yahya, K. M., "Velocity Analysis by Iterative Profile Migration," Geophysics, 54(6):718–729 (1989); Deregowski, S. M., "Common-Offset Migrations and Velocity Analysis," First Break, 8(6):224–234 (1990)). If this migration produces images that are consistent for all the data subsets, then the initial guess for the reference velocity is taken to be correct. If this initial migration produces inconsistent images, then these differences can be used to estimate a corrected velocity that is closer to the true velocity than the initial velocity selected. A flow chart for this method is set forth in FIG. 1. It can be seen from this chart that the calculations are entirely sequential, with the result that this method takes not only significant computer time, but also significant interpretation time. This method usually requires several iterations using the updated velocity for prestack migration each time. Unfortunately, this method is very expensive since prestack migration itself is very expensive. In particular, the cost of CPU time in a supercomputer to output a single three-dimensional prestack migrated line is presently on the order of $200,000.

Figure 2:
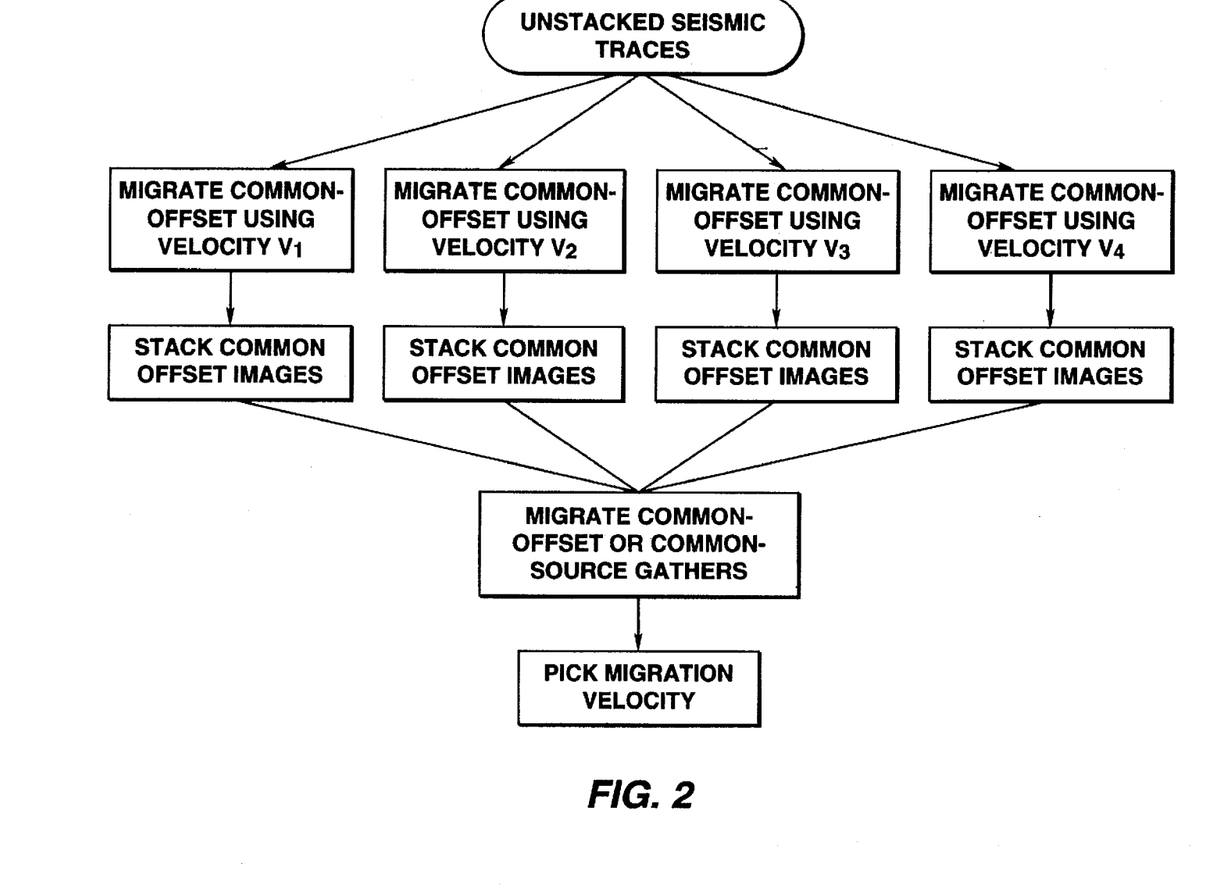
FIG. 2 depicts a flowchart for a typical prestack migration velocity sweep method.

The prestack migration velocity sweep method is closely related to the iterative profile migration method, but performs multiple migrations in parallel rather than sequentially. A migration velocity sweep consists of prestack migrating common-offset gathers simultaneously with several different velocities and summing the migrated images. This produces a set of seismic traces, one group of traces for each velocity, that can be plotted to form a velocity analysis display (see FIG. 2 for flowchart of this method). Velocities that produce consistent images with respect to the different common-offset gathers will produce amplitude peaks on this velocity analysis display. Thus, amplitude peaks on the velocity analysis display can be used to pick the migration velocity function. Because this method involves parallel processing, less interpretation time, but more CPU time, is used than with the iterative prestack migration method.

Figure 3A:
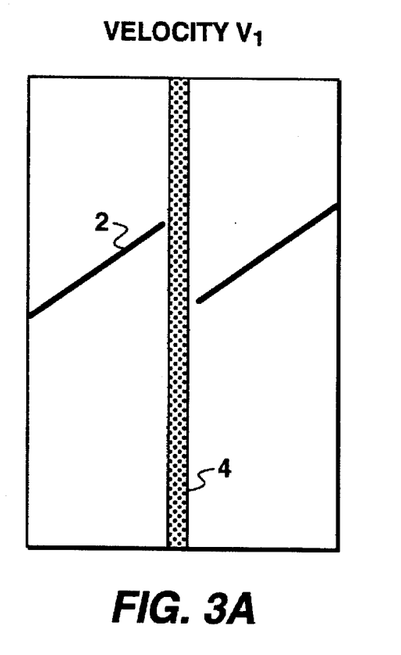
FIGS. 3A and 3B are schematic diagrams illustrating how prestack migration velocity sweeps can produce false velocity picks for dipping reflectors.
Figure 3B:
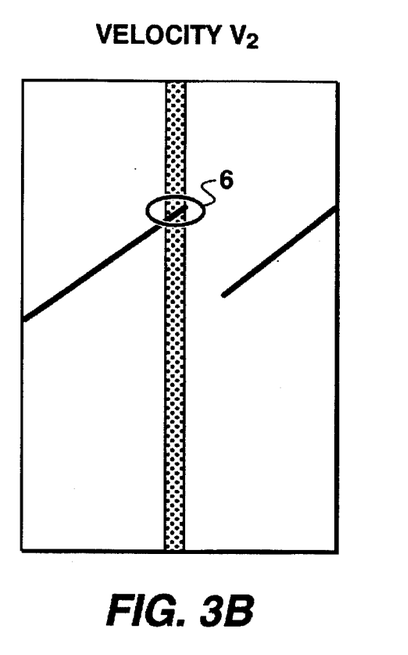

One problem with this prestack migration velocity sweep velocity analysis method is that amplitude peaks can appear at velocities that do not correspond to consistent imaging of the common-offset gathers. This can lead the interpreter to pick incorrect velocities (Schleicher, K. L., Grygier, D. J., et al., Ed., Migration Velocity Analysis: A Comparison of Two Approaches, 61st Annual Internat. Mtg., Soc. Expl. Geophys., Expanded Abstracts, Tulsa, Soc. Expl. Geophys., 1237–1238 (1991)). These erroneous velocity estimates are the result of dipping reflectors migrating into the velocity analysis location as the migration velocity changes (see FIGS. 3A and 3B). FIGS. 3A and 3B are schematic diagrams illustrating how prestack migration velocity sweeps can produce false velocity picks 6 for dipping reflectors. For the faulted reflector 2 shown therein, notice that the event has not migrated into the velocity analysis location 4 at velocity $V_1$ (FIG. 3A) but at velocity $V_2$ (FIG. 3B) the event has migrated into the velocity analysis location. Thus, there will be a relatively high amplitude at velocity $V_2$, even though velocity $V_1$ may be the velocity which produces the most consistent image as a function of source-receiver offset.

This prestack migration velocity sweep method is about ten times more computer intensive than iterative prestack migration, because it requires 10 to 50 applications of prestack migration. However, these computer costs may be offset by the reduced interpretation costs, since the velocity interpreter need pick the migration velocity only once.

A third method for velocity analysis is depth focusing analysis. Depth focusing analysis determines velocities by using downward extrapolation to estimate zero-offset seismic traces at a range of depths. These extrapolations to different depths are all performed with one reference migration velocity. If a reflection has an amplitude peak at the depth corresponding to the two-way vertical traveltime through the reference velocity field, then the reference velocity is the correct migration velocity. Deviations from this condition can be used to estimate the error in the reference velocity (Kim, Y. C. and Gonzalez, R., "Migration velocity analysis with the Kirchhoff Integral," *Geophysics* 56(3): 365–370 (1991); Yilmaz, O. and Chambers, R. E., "Migration Velocity Analysis by Wave-Field Exploration," *Geophysics*, 49(10):1664–1674 (1984)). This method is usually iterated several times until convergence is achieved.

This method can produce false velocity picks 6 for dipping reflectors, which false picks 6 are similar to those produced by prestack migration velocity sweeps discussed above and shown in FIG. 3. (MacKay, S., and Abma, R., Ed., *Depth Focusing Analysis Using a Wavefront-Curvature Criterion*, 62nd Annual Internat. Mtg., Soc. Expl. Geophys., Expanded Abstracts, Tulsa, Soc. Expl. Geophys, 927 (1992)). Furthermore, this method may not converge for steeply dipping reflectors (MacKay, S. and Abma, R., "Imaging and Velocity Estimation with Depth-Focusing Analysis," *Geophysics*, 57(12): 1608–1622 1992).

All the velocity analysis methods discussed above require several applications of prestack migration. Therefore, reducing the cost of prestack migration would have a significant positive impact on the cost of any of these velocity analysis methods.

One way of reducing the cost of prestack migration is to use an inherently fast technique for migration. There are three commonly used wave-equation migration algorithms: frequency-wavenumber migration, finite-difference migration, and Kirchhoff migration. Frequency wavenumber migration and finite-difference migration are generally faster than Kirchhoff migration; however, Kirchhoff migration has several advantages that have made it the method of choice for three-dimensional prestack migration.

First, Kirchhoff migration can handle irregular shooting geometries, such as those commonly encountered in unstacked three-dimensional data. Second, complex migration velocity fields can be used with Kirchhoff migration. Third, Kirchhoff methods can migrate reflectors having very steep dip. Finally, Kirchhoff migration can be used in a target-oriented mode. In this mode, images at a few selected target locations can be produced at a fraction of the cost of using Kirchhoff migration to produce images at all possible output locations. Frequency-wavenumber migration fails with irregular shooting geometries or complex migration fields, while finite-difference migration fails with irregular shooting geometries or reflectors with a very steep dip. Neither frequency-wavenumber nor finite difference migration can be used in a target-oriented mode. These methods must compute the migrated image at all possible output locations. This is important for migration velocity analysis, because velocity analysis can usually be performed at a small fraction of the number of locations at which a seismic image is desired. Therefore, using target-oriented Kirchhoff migration for velocity analysis can be cost competitive with the inherently faster frequency-wavenumber and finite-difference methods. Because of the limitations of these methods, only methods for speeding up Kirchhoff migration were explored for the method of this invention.

The migration techniques proposed herein could be used with non-Kirchhoff migration methods. However, the techniques proposed here achieve their greatest gain in efficiency when used with migration methods that can operate in a target-oriented mode. Therefore, the frequency-wavenumber and finite difference methods would not achieve efficiency gains as great as would the Kirchhoff method, because they cannot operate in a target-oriented mode. However, there may be other migration methods, such as Gaussian beam migration (Hill, N. R., "Gaussian Beam Migration," *Geophysics* 55(11):1416–1428), that would benefit from incorporating limited aperture migration.

The equations describing Kirchhoff migration are well known in the art (Berryhill, J. R., Ed. *Wave Equation Datuming Before Stack*, 54th Annual International Mtg. Soc. Expl. Geophys., Expanded Abstracts, Tulsa, Soc. Expl. Geophys., Session:S2.6 (1984); Schneider, W. A., "Integral Formulation for Migration in Two-Dimensions and Three-Dimensions," *Geophysics* 43(1): 49–76 (1978)). Kirchhoff migration involves summing the input seismic traces along traveltimes corresponding to a point diffractor in the subsurface (see FIG. 4). The migration aperture is defined as all the traces included in this summation for a given output trace. The aperture is usually limited to those traces which have both source and receiver within a specified distance from the output trace location (usually about 5,000 to 25,000 feet).

Figure 4:
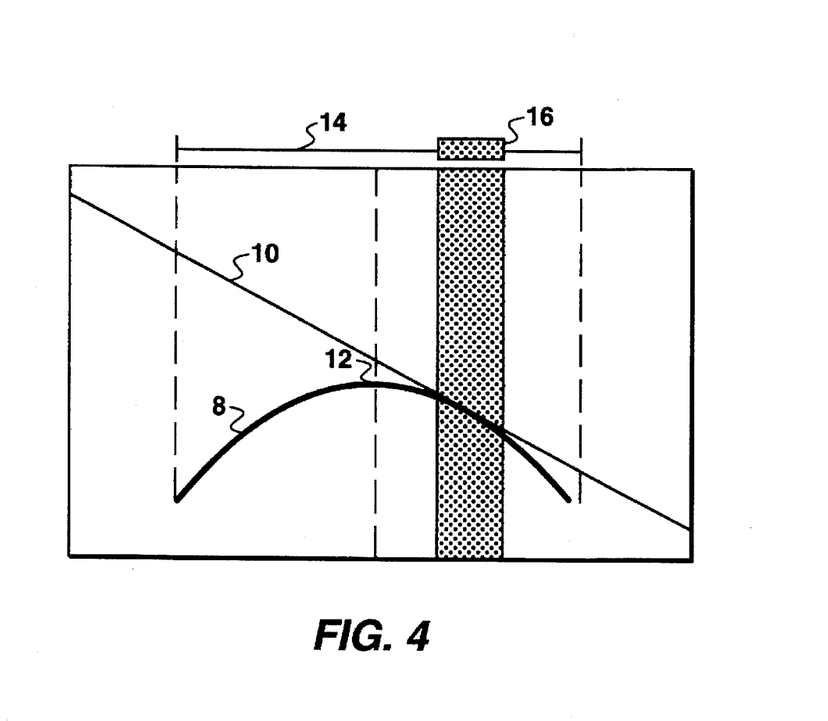
FIG. 4 is a schematic diagram illustrating the Kirchhoff migration method.

FIG. 4 is a schematic diagram illustrating the Kirchhoff migration method. Input traces are summed along the Kirchhoff summation curve 8 (diffraction traveltime curve) and output at the apex of the curve 12. The aperture 14 contains all traces within a specified distance of the output location. For the reflection 10 shown in FIG. 4, only those traces within the shaded area 16 contribute significantly to the sum.

Figure 5:
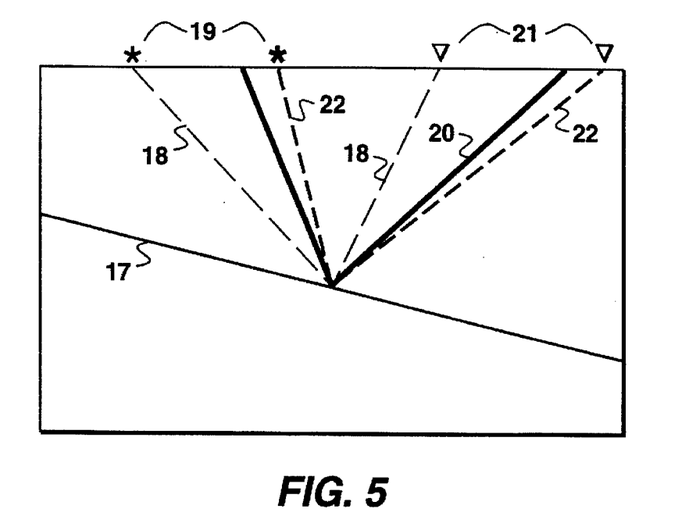
FIG. 5 is an illustration of which input traces will make significant contribution to the migrated image of a reflector.

Those input traces which contribute significantly have diffraction raypaths that are close to an actual reflection raypath (see FIG. 5). FIG. 5 is an illustration of which input traces will make significant contribution to the migrated image of a reflector 17. Sources are indicated by 19 and receivers are indicated by 21. Notice that the traces that contribute significantly 22 will have diffraction raypaths to the imaging point that are close to a reflection raypath 20 for that point, while those traces 18 which do not contribute significantly have diffraction raypaths to the imaging point that are not close to a reflection raypath 20 for that point. Thus, given knowledge of the reflection raypaths 20, raytracing can be used to determine which traces 22 will contribute significantly to the output migrated trace. Raytracing is a technique familiar to those of reasonable skill in the art. Including only those traces that contribute significantly in the Kirchhoff summation speeds up two-dimensional prestack migration by about a factor of 10 and speeds up three-dimensional prestack migration by about a factor of 100.

Figure 6:
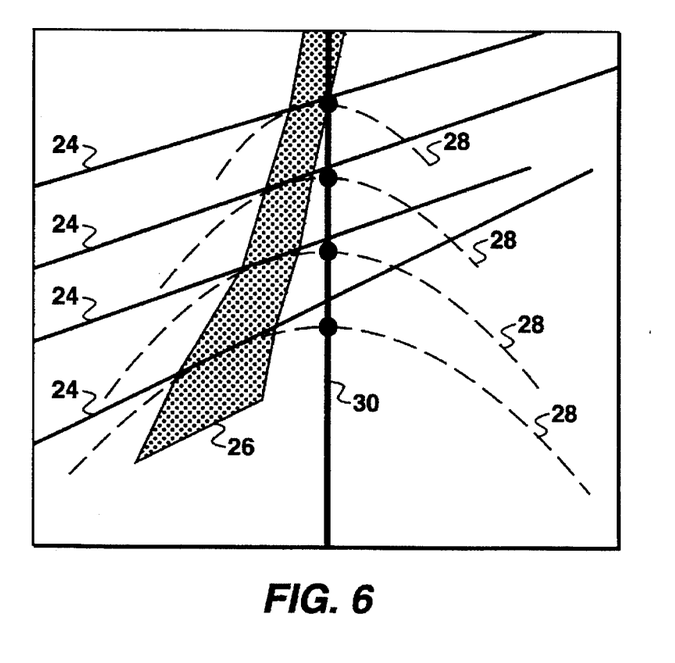
FIG. 6 is a schematic diagram illustrating the directed-aperture method of Carroll et al.

Just such a method has been developed by Carroll et. al. (Carroll, R. J., Hubbard, L. M., et al., "A Directed-Aperture Kirchhoff Migration," *Geophysical Imaging, Symposium of Geophysical Society of Tulsa*, Tulsa, Soc. Expl. Geophys., 151–165 (1987)). They have developed a method for reducing the cost of Kirchhoff prestack migration. They first make a reflector model, based on stacked seismic data. Raytracing is used to determine the locations of sources and receivers that will contribute significantly to the prestack migration of each reflector. They then define a time-varying aperture for prestack migration, centered on these raytraced locations, that is, significantly narrower than a conventional migration aperture (see FIG. 6). FIG. 6 is a schematic diagram illustrating Carroll et. al.'s directed-aperture migration method. Migration hyperbolas are indicated by 28. Normal incidence ray tracing is used to determine the directed aperture 26 used to produce a migrated trace at the output location 30. Since computer CPU time for Kirchhoff migration is proportional to the aperture size, this reduction in aperture should greatly reduce the cost of prestack migration. Carroll et al. call this method directed-aperture migration, since the location of the aperture is moved to different locations depending on a model of the reflectors 24.

The method of Carroll et. al. should significantly reduce the CPU time for prestack migration; however, their method presents a problem. The method still requires reading a large fraction of the input traces to produce a migrated output trace at one location. The reason for this is that the Carroll et al. aperture varies with time; different sets of input traces contribute to the output trace at different times (see FIG. 6). Thus, even though only a small percentage of the input traces contribute at any particular time on the output trace, a much larger percentage of the input traces are required to form all the time samples of an output trace. This problem intuitively means that computer I/O costs will probably not be significantly reduced, even though the CPU costs should be reduced.

It is an object of this invention to present a method for performing prestack migration at a dramatically reduced cost.

It is a further object of this invention to present a method for calculating subsurface velocities at a dramatically reduced cost.

It is a further object of this invention to present a method for calculating subsurface velocities more quickly and more accurately than is possible using current methods.

It is a further object of this invention to eliminate false velocity picks in the determination of subsurface velocities.

It is a further object of this invention to present a method for building an accurate three-dimensional migration velocity from a grid of two-dimensional lines.

It is a further object of this invention to present a method for accurately migrating an existing three-dimensional stack without incurring the large expense of obtaining and reprocessing the three-dimensional unstacked tapes.

It is a further object of this invention to significantly improve the signal-to-noise ratio (S/N) of velocity analysis displays.

Further objects and advantages of this invention will be seen by one skilled in the art of geophysical data processing upon review of the specification, figures and claims herein.

SUMMARY OF THE INVENTION

This invention is a method for analyzing seismic signals for analysis of a subsurface volume of the earth, comprising the steps of a. collecting a set of seismic traces;

b. selecting a surface location;

c. determining the migrated positions of reflection dips, which reflection dips before migration appear to be below the location;

d. selecting a zone on the surface around said location, which zone is at most half as large as the migration aperture required to image all points located vertically beneath said location;

e. selecting those traces which have source-receiver midpoints falling within said zone; and f. performing migration velocity analysis on said selected traces at the migrated position of each reflection.

This invention reduces the cost of migration velocity analysis by reducing the amount of computer time required for prestack migration. Two methods are used to reduce this computer time. Both methods increase the efficiency of Kirchhoff migration by limiting the amount of input seismic data.

The first method, limited-aperture migration, is the method set forth above. It reduces the size of the migration aperture.

The second method, Monte Carlo migration, is used in conjunction with the limited aperture migration in the preferred embodiment of this invention. Monte Carlo migration increases efficiency by migrating only a small, randomly selected fraction of the input traces. These methods significantly reduce the cost of prestack migration and eliminate spurious velocity picks from velocity analysis displays. In addition, using the limited aperture method without the Monte Carlo technique improves S/N over conventional techniques.

Both methods can be applied to either two-dimensional or three-dimensional seismic data. However, for three-dimensional data the gain in efficiency is about a factor of 10 larger than for two-dimensional.

BRIEF DESCRIPTION OF THE DRAWINGS

FIG. 3A depicts migration at velocity $V_1$, while FIG. 3B depicts migration at velocity $V_2$.

DESCRIPTION OF THE PREFERRED EMBODIMENT

The within invention is principally of a limited aperture migration method. In its preferred embodiment, the limited-aperture method is used in conjunction with Monte Carlo migration, discussed herein.

Conventionally, migration apertures contain all input traces having sources and receivers within about 5,000 to 25,000 feet of the output image location. The limited-aperture portion of this invention migrates relatively small (500 to 5,000 feet) fixed apertures of the input data to reduce the cost of prestack migration. Since the computer time required for Kirchhoff migration is proportional to the amount of input data, this results in up to a factor of 10 improvement in efficiency for two-dimensional migration. For three-dimensional data, the gain in efficiency is up to a factor of on the order of 100 since the aperture is limited in two directions.

Figure 7:
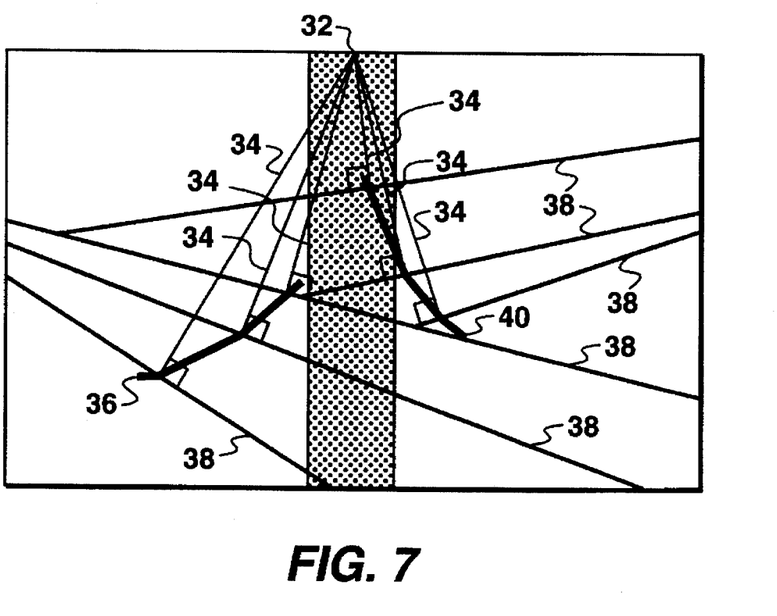
FIG. 7 is a schematic diagram illustrating the limited-aperture migration method of this invention.

Conventionally, an output image is formed along a straight, vertical line at the center of the migration aperture. However, when migrating small fixed apertures, as proposed in this invention, reflections with even a small amount of dip will migrate out of the region defining the aperture (see FIG. 7). FIG. 7 is a schematic diagram illustrating the limited-aperture migration method. Reflectors are indicated as 38. Normal incidence raypaths 34 that pass through the center of the input aperture 32 indicate output locations to which the input aperture makes a significant contribution. These locations define curves 36 and 40 along which the images will be computed. Notice that there can be more than one output image curve.

Examination of FIG. 7 makes it clear that images cannot, in limited aperture migration, be constructed along straight, vertical lines. The key to limited aperture migration is that images are constructed at the locations 36 and 40 to which the reflections, at the center of the limited aperture 32, will migrate. These locations describe curves 36 and 40 (see FIG. 7) that replace the vertical lines conventionally used to form migrated images.

In order to gain a computational advantage from limited-aperture migration there must be an inexpensive method for determining the output image curves 36 and 40. As is known to those of reasonable skill in the art, there are many methods for defining these curves 36 and 40. One good method is to digitize reflections on an existing stack of the seismic data. The time dips of these digitized reflections are then calculated at the center of the limited aperture 32 to be migrated. Kinematic migration (often called map migration (Maher, S. M., and Hadley, D. M., Ed., *Development of an Accurate, Staple and Interactive Map Migration Algorithm*, 55th Annual Internat. Mtg., Soc. Expl. Geophys., Expanded Abstracts, Tulsa, Soc. Expl. Geophys., Session:S15.8 (1985)) is used to predict, from these time dips, the locations to which the reflections will migrate. This kinematic migration is performed with the same reference migration velocity that will be used for prestack migration velocity analysis. Output image curves 36 and 40 are then defined which pass through the output locations 36 and 40 predicted by kinematic migration (see FIG. 7). All the processes used to determine these output curves are much less expensive than prestack migration.

The output curves 36 and 40 are defined using stacked data, and are therefore guaranteed to be correct only for small source-receiver offset input traces. For steeper reflector dips, large source-receiver offsets will migrate to different locations than small offsets. This problem can be overcome by increasing the size of the limited aperture 32. As would be apparent to one of reasonable skill in the art, the proper size of the limited aperture 32 is data-dependent, and many methods could be used to determine the proper size of the limited aperture 32. One method is to run limited-aperture migration for several different aperture sizes at the location in the seismic data containing the steepest dips. These aperture size tests should be performed at a relatively high reference velocity to produce a conservative estimate for the minimum aperture size. The minimum test aperture size that still produces a good migration can be used to migrate the remainder of the data. More sophisticated tests, as would be apparent to one of reasonable skill in the art, for instance using ray tracing, could be used to determine an optimum aperture size at each location in the seismic survey.

For three-dimensional seismic data it may be advantageous to use an aperture 32 that has different sizes in the inline and crossline direction. In particular, for marine three-dimensional data the inline projection of the source-receiver offset usually has a much larger range than the crossline projection. Thus, in the crossline direction the data appears to be essentially zero offset. This implies that the limited aperture 32 can be much smaller in the crossline direction than the inline direction. Land three-dimensional data, gathered using a swath technique, can also benefit by using smaller crossline apertures than inline apertures.

Two-dimensional seismic data are a limiting case having an aperture width in the crossline direction that is essentially zero. We have found that the techniques employed for limited aperture migration apply even in this limiting case. Velocity analysis displays resulting from application of limited aperture migration to two dimensional data are as accurate as those obtained from three dimensional data, though the displays are noisier. This implies that accurate three dimensional velocities can be obtained from a grid of two dimensional seismic lines. In this case the three dimensional dips, required for limited aperture migration, can be determined at the intersections of the two dimensional lines in the grid or from a coincident three dimensional survey. This capability is important, because it can be used to determine accurate three dimensional velocities without incurring the large expense of purchasing an unstacked three dimensional seismic survey. Such velocities would be useful, for example, for post-stack migration of a stacked three dimensional survey or for map migration of a grid of two dimensional lines.

Limited-aperture migration produces migrated seismic data with higher S/N than conventional migration (Carroll, Hubbard et al. 1987; Krebs, J. R., "Three-Dimensional Migration of Swath Surveys," *Geophysics*, 55(9) :1251–1259 (1990)). The reason for this is that limited-aperture migration sums only over those portions of the Kirchhoff summation curve 8 that make a significant contribution 16 to the migration of the reflection of interest 10 (see FIG. 4). The remaining portions of the summation curve 8 usually do not sum to zero. This non-zero sum is noise that conventional wide-aperture migration adds to the image of the reflection.

In the preferred embodiment of the method of this invention, Monte Carlo migration is used in conjunction with limited-aperture migration. Monte Carlo migration is the application of Monte Carlo integration theory to migration of seismic data.

Monte Carlo integration is a well known mathematical technique for estimating the value of a multidimensional integral having a smoothly varying integrand within the region to be integrated (Press, W. H., Flannery, B. P., et al., *Numerical Recipes: The Art of Scientific Computing*, Cambridge, Cambridge University Press, pages 126–130 (1986)). Rather than summing the function to be integrated over a uniformly sampled region, Monte Carlo integration sums over a sparse random sampling of the region. This can greatly reduce the amount of computer time required to compute an integral.

Kirchhoff prestack migration is a multi-dimensional integral, and the Monte Carlo method can be applied by simply rejecting, preferably randomly rejecting, some percentage of the input traces before migration. Unfortunately, when this is applied to conventional wide-aperture Kirchhoff migration, the result is unacceptably noisy. The cause of this noise is that the integrand for Kirchhoff migration is not smooth over the entire aperture, and therefore violates an assumption of the Monte Carlo method. In particular, the integrand for Kirchhoff migration is smooth only over those portions of the aperture that contribute significantly to the output image. Therefore, any migration technique which limits the region of integration to this smooth portion of the integrand can be enhanced by use of Monte Carlo migration. In fact, the Monte Carlo method could be combined with the directed-aperture method of Carroll et al. to further improve that method. Since limited-aperture migration limits the region of integration to this smooth portion of the integrand, Monte Carlo techniques can be used in conjunction with limited-aperture migration, even though they would fail with conventional Kirchhoff migration. As will be seen herein, Monte Carlo migration does reduce S/N even when combined with limited-aperture migration. Good results have been achieved with only a random 10 percent of the input traces being used. Further, even when 90 percent of the input traces are randomly eliminated from migration velocity analysis, combined limited-aperture/Monte Carlo migration still achieves a S/N that is better than that achieved by conventional prestack migration. This results in an additional factor of 10 reduction in computer costs. Thus, if the improved S/N afforded by limited-aperture migration is not important for a particular set of data, the Monte Carlo method can be used to reduce the cost of velocity analysis beyond that achieved by using limited-aperture migration alone. The net result is S/N approximately identical to that achieved by conventional migration methods at significantly less than 1% of the cost of computer time.

The Monte Carlo method could be particularly important when using iterative velocity analysis methods. Iterative methods require reading the unstacked seismic data many times. Unstacked three-dimensional data can contain on the order of 1,000 tapes; thus, even the simple act of reading all of these tapes several times can lead to considerable expense. However, when using the Monte Carlo method, approximately 90 percent of the input traces are randomly rejected before velocity analysis begins. Thus, each iteration of velocity analysis will require reading only about 10 percent of the number of tapes that would otherwise be required.

Figure 8:
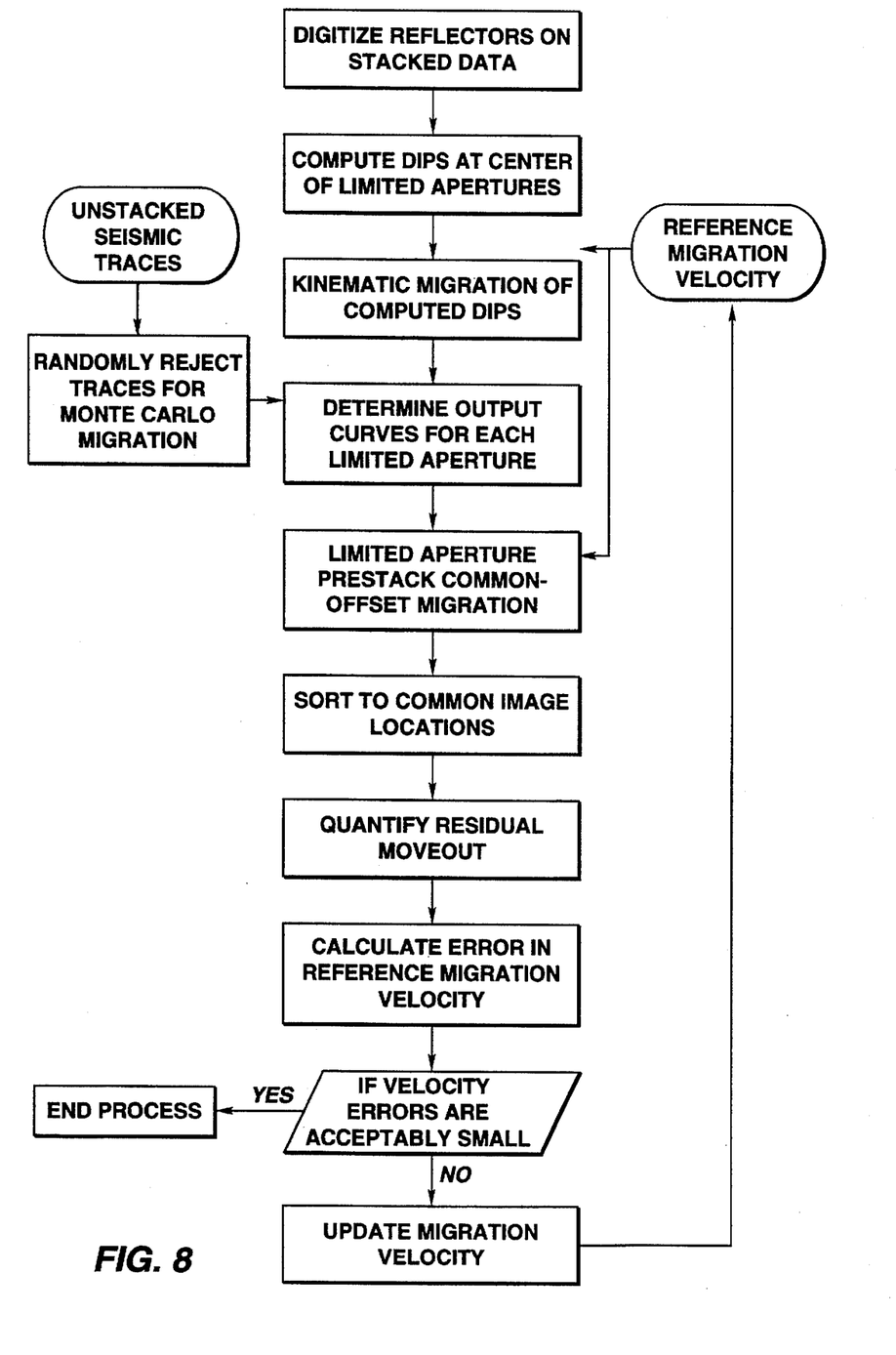
FIG. 8 is a flowchart for the preferred embodiment of the limited-aperture common-offset migration velocity analysis method of this invention.

Limited-aperture and Monte Carlo migration can be used to improve any velocity analysis method which uses prestack migration or wave equation extrapolation. FIG. 8 is a flowchart showing how these methods would be used with iterative profile prestack migration. The flow chart is very similar to that shown in FIG. 1, except some premigration work must be done to determine the output curves for each limited aperture, and, further, the optional Monte Carlo restriction is indicated on FIG. 8.

The following is a summary of the advantages gained by this invention:

1. Reduced CPU and I/O time for migration velocity analysis. Limited-aperture migration velocity analysis for two-dimensional data reduces CPU and I/O times by about a factor of 10, and for three-dimensional data the reduction is about a factor of 100. By using Monte Carlo migration another factor of 10 reduction can be achieved, for a total reduction of 1,000 times for three-dimensional data.

2. Improved S/N of velocity analysis displays.

3. With the limited aperture method, two-dimensional lines can be treated as if they were three-dimensional data with a very narrow limited aperture in the crossline direction. Thus, a grid of two-dimensional lines can be used to determined velocities that are accurate for three-dimensional migration. This could result in a very large cost savings for three-dimensional velocity analysis, since velocities for three-dimensional post stack migration can be produced without purchasing three-dimensional unstacked tapes.

4. The fixed aperture for this invention forces the use of different output curves for each velocity in a prestack migration velocity sweep. This has the benefit of eliminating the false velocity picks from migration velocity sweep displays discussed above.

5. The number of tapes read in each iteration of velocity analysis can be reduced by about a factor of 10 by using the Monte Carlo migration method.

Carroll et. al.'s directed-aperture migration and the limited-aperture migration method proposed here should produce similar gains in CPU time efficiency. Also, the S/N improvement of migrations produced by the two methods should be similar. However, there are several major differences between this invention and Carroll et. al.'s.

The main difference is that this method uses a fixed aperture of input data while calculating images along output curves that are not vertical. Carroll et. al.'s directed-aperture technique computes a time varying aperture while calculating images along vertical lines. This difference results in the following advantages that were discussed above and cannot be achieved with the Carroll et. al.'s method:

1. Improved I/O performance.

2. Determination of accurate three-dimensional migration velocities from a grid of two-dimensional lines.

3. Elimination of false velocity picks from velocity sweep displays.

4. Reduced number of tapes read per iteration of velocity analysis.

Note that Carroll et. al. do not propose using their method for migration velocity analysis. Rather, they use their method only to speed up the final prestack migration after another method was used to determine the migration velocities. Also, Carroll et. al. do not use Monte Carlo migration to produce an additional factor of 10 improvement in efficiency.

EXAMPLE

The following is an example of limited-aperture migration velocity analysis using common-offset migration as discussed in the previous section. The data are from a three-dimensional marine survey. The data were processed as shown in FIG. 8. To quantify the residual moveout and calculate an updated migration velocity, the fairly simple process shown in FIG. 9 was applied. This method converged after four iterations of prestack common-offset migration. Other methods of quantifying moveout and updating the velocity could be substituted, and may lead to faster convergence.

The velocity analysis was performed using conventional wide-aperture prestack migration (aperture 26,250×7,875 feet), limited-aperture migration (aperture 4,375×875 feet), and combined limited-aperture/Monte Carlo migration (90% of input traces rejected for Monte Carlo). All three types of migration yielded the same velocity function. This agreement confirms the accuracy of the limited-aperture and Monte Carlo migrations.

Figure 9:
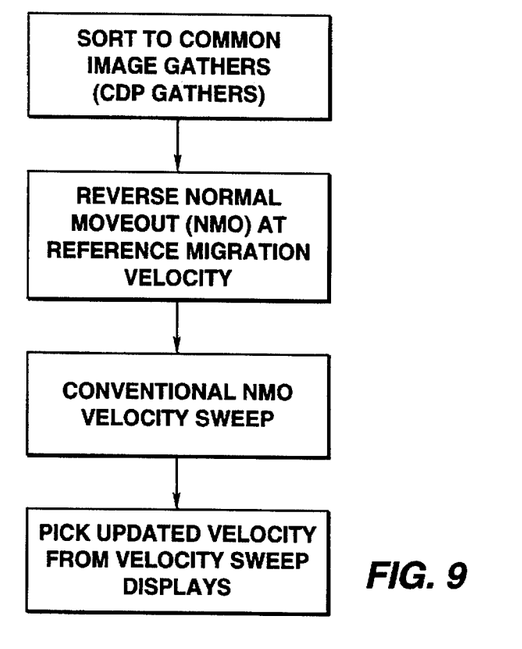
FIG. 9 shows processes used to quantify residual moveout and update the migration velocity for common-offset migration.
Figure 10:
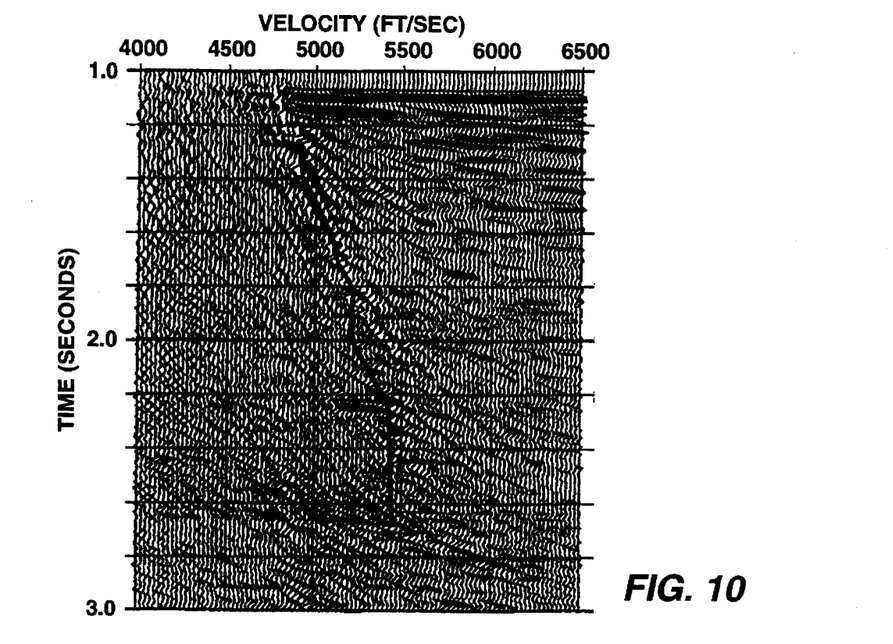
FIG. 10 is a velocity analysis display of the data in the Example, resulting from the first iteration of a conventional wide-aperture migration.
Figure 11:
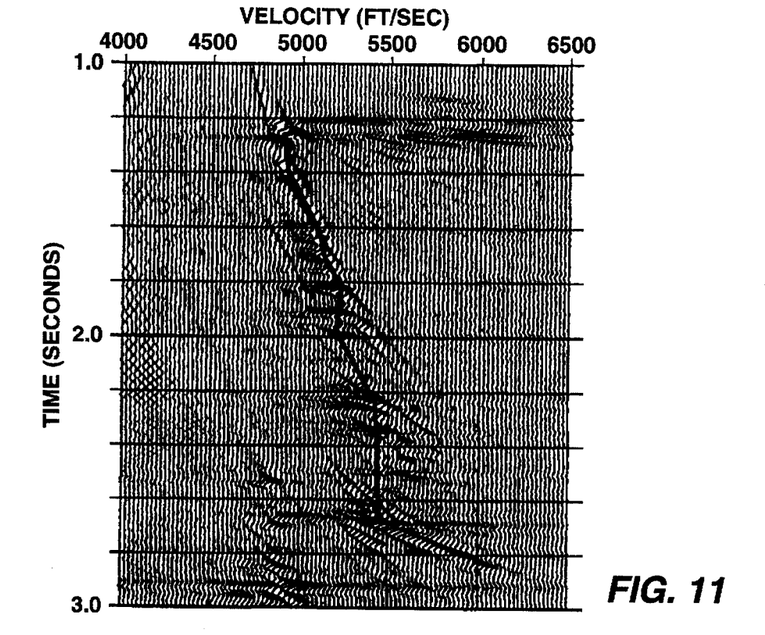
FIG. 11 is a velocity analysis display of the data in the Example, resulting from the first iteration of limited-aperture migration, the method of this invention.
Figure 12:
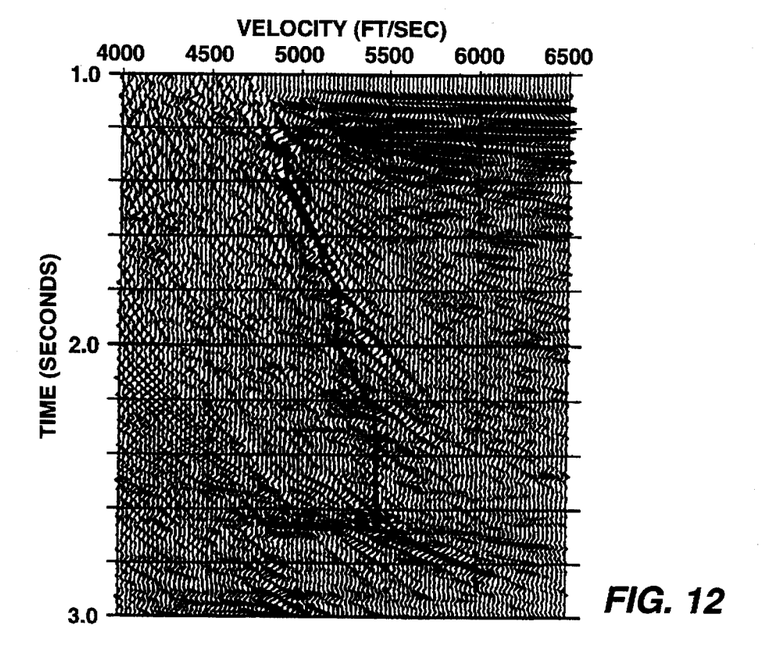
FIG. 12 is a velocity analysis display of the data in the Example, resulting from the first iteration of limited-aperture/Monte Carlo migration, the preferred embodiment of this invention.

FIGS. 10–12 compare velocity sweeps resulting from the processes shown in FIG. 9. FIG. 10 shows a velocity analysis display resulting from the first iteration of conventional wide-aperture migration. The digitized curve is the updated velocity function to be input to the second iteration of velocity analysis. FIG. 11 shows a velocity analysis display resulting from the first iteration of limited-aperture migration. The updated velocity curve was digitized from the conventional wide-aperture velocity display shown in FIG. 10. FIG. 12 shows a velocity analysis display resulting from the first iteration of limited-aperture/Monte Carlo migration. Ninety percent of the input traces were randomly rejected. The updated velocity curve was digitized from the conventional wide-aperture velocity display shown in FIG. 10.

The accuracy of the limited-aperture and Monte Carlo migration is demonstrated by the fact that the velocity curve digitized from the wide-aperture migration passes through all the high amplitude velocity peaks in FIGS. 11 and 12. Also, notice the increased S/N of the limited-aperture migration relative to the conventional wide-aperture migration. The Monte Carlo migration also has higher S/N than conventional wide-aperture migration, though not as good as limited migration-aperture alone.

The differences in CPU time for the three methods are shown in Table 1. Limited-aperture migration using the data of this example is approximately 50 times less expensive than conventional wide-aperture migration, and Monte Carlo migration gave another factor of approximately 10 decrease in expense.

TABLE 1

COMPARISON OF CPU TIMES FOR PRESTACK MIGRATION VELOCITY ANALYSIS

| Type of Migration | Cray-YMP CPU Time |
| --- | --- |
| Conventional Wide Aperture | 2,756 seconds |
| Limited Aperture | 55 seconds |
| Limited Aperture with Monte Carlo | 6 seconds |

What is claimed is:

1. A method of processing seismic data deriving from a subsurface volume of the earth, comprising the steps of:
   a) specifying a family of locations on the surface of said volume;
   b) for each said surface location,
      i) using reflection time dips to determine subsurface locations to which reflections in said data will migrate;
      ii) using said subsurface locations to define a limited migration aperture centered on said surface location; and
      iii) selecting a subset of said seismic data, said data in said subset having midpoints falling within said limited migration aperture; and
   c) performing migration velocity analysis on each said subset of said seismic data.

2. The method of claim 1, wherein said reflection time dips are determined from a stack of said data.

3. The method of claim 1, wherein said subsurface locations to which said reflectors will migrate are determined by kinematic migration.

4. The method of claim 3, wherein output image curves are defined from said subsurface locations, said output image curves used to determine said limited migration aperture.

5. The method of claim 1, wherein said analysis involves the calculation of an error in a reference migration velocity.

6. The method of claim 1, wherein said analysis involves iterative prestack migration.

7. The method of claim 1, further comprising the step of eliminating at least a portion of said seismic data from each said subset, said analysis being performed on said subset after said elimination.

8. The method of claim 7, wherein said elimination is performed randomly.

9. The method of claim 7, wherein said analysis involves iterative prestack migration.

10. A method of processing seismic data deriving from a subsurface volume of the earth, comprising the steps of:
    a) specifying a family of locations on the surface of said volume;
    b) for each said surface location,
       i) determining time dips of reflections in a stack of said data;
       ii) using kinematic migration to determine, from said time dips, subsurface locations to which said reflections will migrate;
       iii) defining output image curves from said subsurface locations;
       iv) using said output image curves to define a limited migration aperture centered on said surface location; and
       iv) selecting a subset of said seismic data, said data in said subset having midpoints falling within said limited migration aperture; and
    c) performing migration velocity analysis on each said subset of said seismic data.

11. The method of claim 10, wherein said analysis involves iterative prestack migration.

12. The method of claim 10, further comprising the step of eliminating at least a portion of said seismic data from each said subset, said analysis being performed on said subset after said elimination.

13. The method of claim 12, wherein said elimination is performed randomly.

14. The method of claim 13, wherein said analysis involves iterative prestack migration.

15. A method of processing seismic data deriving from a subsurface volume of the earth, comprising the steps of:
    a) specifying a family of locations on the surface of said volume;
    b) for each said surface location,
       i) determining time dips of reflections in a stack of said data;
       ii) using kinematic migration to determine, from said time dips, subsurface locations to which said reflections will migrate;
       iii) defining output image curves from said subsurface locations;
       iv) using said output image curves to define a limited migration aperture centered on said surface location; and
       iv) selecting a subset of said seismic data, said data in said subset having midpoints falling within said limited migration aperture; and
       v) performing a Monte Carlo elimination of at least a portion of said seismic data from each said subset; and
    c) performing migration velocity analysis on each said subset of said seismic data.

16. The method of claim 15, wherein said analysis involves iterative prestack migration.

* * * * *